United States Patent [19]

Coleman

[11] Patent Number: 5,134,385
[45] Date of Patent: Jul. 28, 1992

[54] TRAFFIC-SAFETY SIGNALLING MEANS FOR TRAILERED EQUIPMENT

[76] Inventor: Andrew L. Coleman, 46 Warren Rd., Randolph, N.J. 07869

[21] Appl. No.: 560,089

[22] Filed: Jul. 30, 1990

[51] Int. Cl.⁵ .............................................. B60Q 7/00
[52] U.S. Cl. ................................... 340/473; 340/431; 340/468
[58] Field of Search ............... 340/431, 473, 468, 984, 340/479, 480, 487, 470–472; 116/26; 280/414.1; D12/162; 362/61, 80, 32, 83.2, 83.3; 114/343; 307/9.1, 10.8

[56] References Cited

U.S. PATENT DOCUMENTS

| | | | |
|---|---|---|---|
| 2,975,401 | 3/1961 | Shupe | 340/431 |
| 3,080,581 | 3/1963 | Smihal | 362/61 |
| 3,916,377 | 10/1975 | Demeter | 340/468 |
| 4,045,122 | 8/1977 | Burdick | 280/414.1 |
| 4,052,697 | 10/1977 | Daifotes | 340/472 |
| 4,395,749 | 7/1983 | Poveromo | 362/80 |
| 4,447,802 | 5/1984 | Böse | 340/473 |
| 4,625,265 | 11/1986 | Bushong | 340/472 |
| 4,800,471 | 1/1989 | Lippert | 340/479 |
| 4,809,138 | 2/1989 | Stovall | 362/61 |
| 4,835,515 | 5/1989 | McDermott et al. | 340/472 |
| 4,992,788 | 2/1991 | Arndt | 340/473 |

FOREIGN PATENT DOCUMENTS 2192017 12/1987 United Kingdom ............... 340/473

*Primary Examiner*—Jin F. Ng
*Assistant Examiner*—Brent A. Swarthout
*Attorney, Agent, or Firm*—Bernard J. Murphy

[57] ABSTRACT

The signalling means is removably attachable to the rearmost portion of a trailered equipment, such as a power boat, and carries electrical lamps which are powered from the trailer electrical system. The lamps are set in a portion of the signalling means which is vertically disposable to present clear, illuminated signals to nearby traffic.

11 Claims, 2 Drawing Sheets

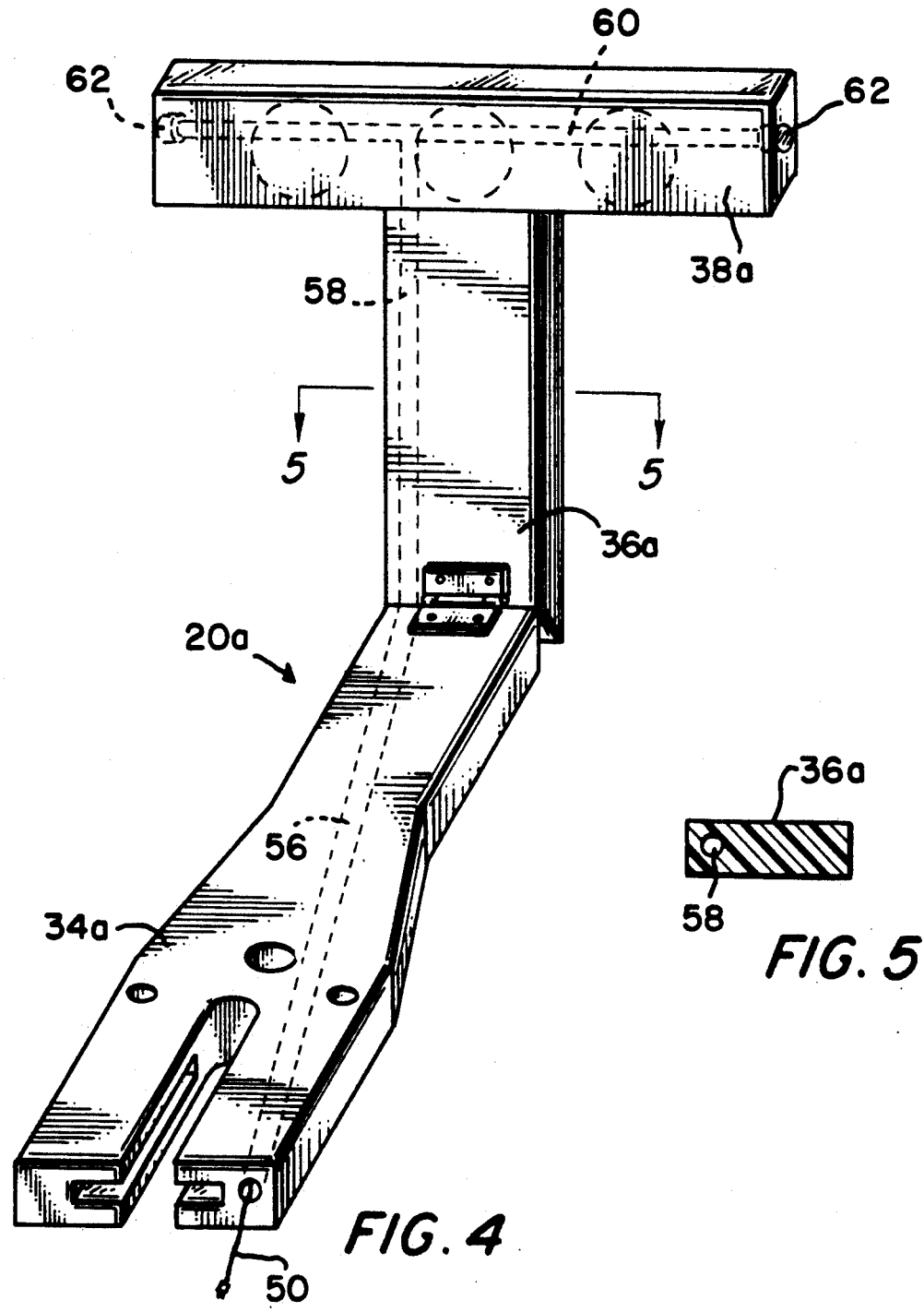

TRAFFIC-SAFETY SIGNALLING MEANS FOR TRAILERED EQUIPMENT

BACKGROUND OF THE INVENTION

This invention pertains to traffic-safety signalling means, such as directional signals, brake lights, and the like, and in particular to such means for removable attachment thereof to trailered equipment, for instance: power boats.

Trailered equipment, especially power boats, commonly overhang the rearmost end of the trailer upon which they are carried. When trailering larger boats, i.e., those nineteen to twenty-eight feet long, and eight to eight and a half feet wide, the rear of the boat extends from three to five feet beyond the end of the trailer. Then, the engine outdrive, in turn, extends another three to four feet from the rear of the boat. Consequently, the rearmost lights of the trailer are from six to nine feet forward of the rearmost portion of the trailered equipment—in the example given, the outdrive of the boat engine. Those lights, those traffic-safety signalling means of the trailer, therefore, are difficult to see. Especially is this so at dusk, under rainy conditions, during a fog, and other inclement weather. Even if the driver of the trailer-towing vehicle gives proper signals, and has correctly functioning brake lights, drivers of other vehicles alongside and behind the trailered equipment cannot always sense how close is the trailered equipment, or where it actually ends.

What has been needed is a traffic-safety signalling means which can be removably attached to the very rearmost portion of the trailered equipment and which will faithfully duplicate visual signals of the trailer-towing vehicle.

It is an object of this invention, then, to set forth just such a long-sought signalling means for trailered equipment.

SUMMARY OF THE INVENTION

It is particularly an object of this invention to set forth traffic-safety signalling means for trailered equipment comprising a body; wherein said body has means for removable attachment thereof to such trailered equipment; said body also has electrically-operative, visual-signalling means coupled thereto; said body further has means for conducting electrical power to said visual-signalling means; said body comprises an elongate limb; and said limb has an overall, given length, and comprises means for collapse thereof to substantially half said given length for accommodating compact storage of said traffic-safety signalling means.

Further objects of this invention, as well as the novel features thereof, will become more apparent by reference to the following description taken in conjunction with the accompanying figures, in which:

BRIEF DESCRIPTION OF THE DRAWINGS

FIG. 4 is an illustration like that of FIG. 2, albeit of an alternative embodiment of the invention; and FIG. 5 is a cross-sectional view taken along section 5—5 of FIG. 4.

DESCRIPTION OF THE PREFERRED EMBODIMENT

Figure 1:
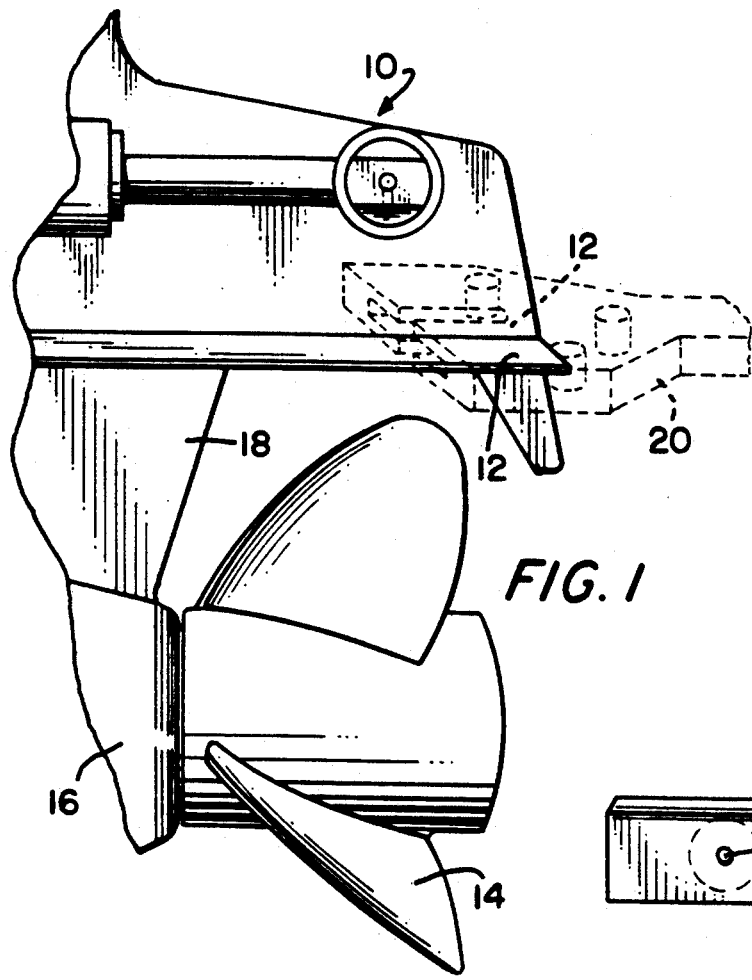
FIG. 1 is a perspective illustration of a portion of an outdrive of an engine for a power boat, and a phantomed depiction of a section of the novel signalling means, according to an embodiment thereof, attached to the trim tabs of the outdrive.
Figure 3:
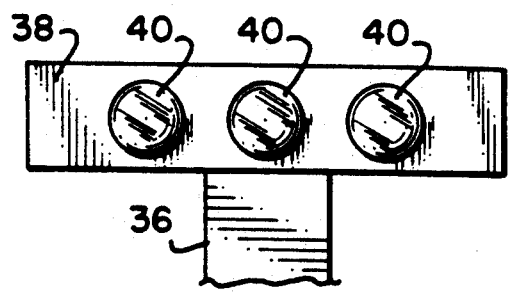
FIG. 3 is a vertical illustration of the reverse side (from FIG. 2) of the light bank of the signalling means.

As shown in FIG. 1, a power boat engine 10, only a portion of the outdrive thereof being shown, has generally horizontal trim tabs 12, a propeller 14, a gear case 16 and a generally vertical shaft housing 18. Only one of the trim tabs 12 is visible; the other is on the opposite side, lying in a common plane with the one which is visible.

Figure 2:
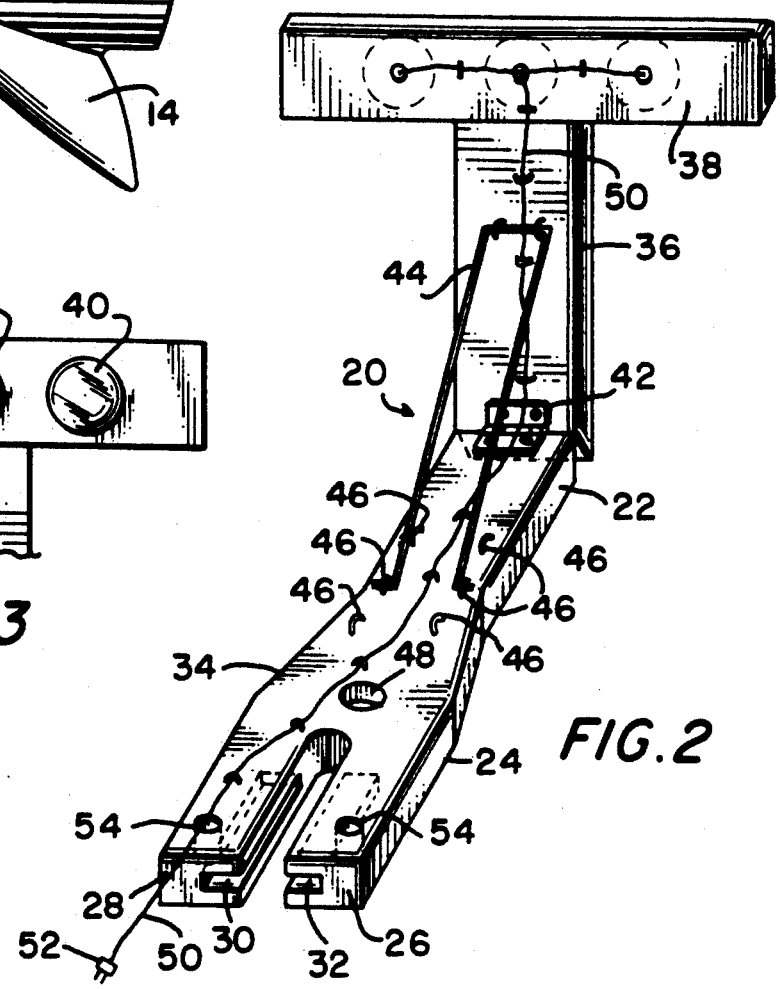
FIG. 2 is a perspective depiction of the invention, the same showing one side thereof.

The novel signalling means 20 comprises an articulated limb 22, as shown in FIG. 2, which has a bifurcation 24 at one end thereof. The branches 26 and 28 of the bifurcation have grooves 30 and 32 formed therein in confronting relationship. The grooves 30 and 32 slidably engage the trim tabs 12 of the engine 10. The limb 22 is formed of two sections 34 and 36. The bifurcation 24 is formed at an end of section 34 and at the opposite end of section 36 is fixed a light bank 38. The light bank 38 has three lamps 40 mounted thereon. Sections 34 and 36 are joined together, at abutting ends thereof, by means of a hinge 42. As a consequence thereof, the signalling means 20 may be folded up, into about half its extended length, for compact storage when not in use. A U-shaped latch 44 is pivotably mounted to section 36, and the legs thereof selectively engage loops 46 which are fixed in the section 34 to adjust the angle of the signalling means 20 so that section 36 will be substantially vertical when in use. As an added feature, the signalling means has a hole 48 formed in the section 34 in which to store the boat drain plug. This disposes the plug in a very visible location toward assuring that it is not lost or overlooked when launching the boat.

Electrical wires 50 are stapled to the light bank 38, and the sections 36 and 34. The wires carry electrical power to the lamps 40 by means of a connector 52 which is to be spliced into the trailer's brake light. Consequently, the lamps 40 will be illuminated when the towing vehicle's headlights are turned on. Too, they will brighten when the brakes are applied, and flash when the hazard/flasher is used.

As noted earlier, the grooves 30 and 32 slidably engage the trim tabs 12. In addition, to secure the signalling means in place, a pair of holes 54 are formed in the bifurcation 24 to receive an elastic lashing (not shown); the lashing is to be made taut about the shaft housing 18 and fastened into the holes 54. The signalling means 20, then, cannot come free of the trim tabs 12.

An alternative embodiment of the signalling means 20a is shown in FIGS. 4 and 5, where same or similar index numbers denote same or similar components as in the first embodiment 20. In this latter version, the wires 50 are confined within the signalling means 20a. Sections 34a and 36a have channelling 56 and 58 formed therein, and the light bank 38a has corresponding channelling 60, to house the wires 50. Ends of the channelling 60 have sealing plugs 62 set therein.

As will be appreciated, the signalling means 20 and/or 20a, in use, projects rearwardly and upwardly from the rearmost portion of the trailered equipment (power boat engine 10, in the subject disclosure), and presents readily visible signals for all those in the immediate vicinity to observe. Installation is especially simple and facile, and the signalling means can be halved in size for ease of storage.

While I have described my invention in connection with specific embodiments thereof, it is to be understood that this is done only be way of example, and not as a limitation to the scope of my invention as set forth in the objects thereof and in the appended claims. For example, the signalling means could be self-powered by a battery. Too the limb could take the form of telescoping sections, in lieu of hinged sections. These and all other modifications of the invention are deemed to be within the ambit of my conception, and encompassed by the following claims:

I claim:

1. Traffic-safety signalling means for trailered equipment, comprising:
   a body; wherein
   said body has means for removable attachment thereof to such trailered equipment;
   said body also has electrically-operative, visual-signalling means coupled thereto;
   said body further has means for conducting electrical power to said visual-signalling means;
   said body comprises an elongate limb,
   said limb is articulated intermediate the length thereof; and
   said removable attachment means comprises means, at an end of said limb, for slidable engagement with such trailered equipment.

2. Traffic-safety signalling means for trailered equipment, comprising:
   a body; wherein
   said body has means for removable attachment thereof to such trailered equipment;
   said body also has electrically-operative, visual-signalling means coupled thereto;
   said body further has means for conducting electrical power to said visual-signalling means;
   said body comprises an elongate limb;
   said limb is articulated intermediate the length thereof;
   said limb has a bifurcation at one end thereof which defines parallel branches; and
   said branches have mutually confronting grooves formed therein.

3. Traffic-safety signalling means, according to claim 1, wherein:
   said limb comprises a plurality of sections; and
   said sections are hingedly joined together, at abutting ends thereof.

4. Traffic-safety signalling means, according to claim 3, further including:
   means mounted on said section for adjustably setting said sections at selected angles therebetween.

5. Traffic-safety signalling means, according to claim 2, wherein:
   said power conducting means is confined within said limb.

6. Traffic-safety signalling means, according to claim 5, wherein:
   said limb has a borehole formed therein, generally lengthwise thereof; and
   said power conducting means comprises electrical wires in penetration of said borehole.

7. Traffic-safety signalling means according to claim 1, wherein:
   said limb has means for attaching lashing thereto for lashing said limb to trailered equipment.

8. Traffic-safety signalling means, according to claim 7, wherein:
   said lashing attaching means comprises a pair of holes formed in said limb in adjacency to an end of said limb.

9. Traffic-safety signalling means, according to claim 2, wherein:
   said limb further comprises means for storing a boat drain plug.

10. Traffic-safety signalling means, according to claim 9, wherein:
    said plug storing means comprises a hole formed in said limb in which to receive such boat drain plug with a snug, interference fit.

11. Traffic-safety signalling means for trailered equipment, according to claim 1, wherein:
    said limb has an overall, given length, and comprises means for collapse thereof to substantially half said given length for accommodating compact storage of said traffic-safety signalling means.

* * * * *